United States Patent
Wang et al.

(10) Patent No.: US 10,120,848 B2
(45) Date of Patent: Nov. 6, 2018

(54) METHODS AND SYSTEMS FOR APPLYING RESPONSIVE DESIGN TO SUBFRAMES ON A WEB PAGE

(71) Applicant: salesforce.com, inc., San Francisco, CA (US)

(72) Inventors: Michael Wang, San Francisco, CA (US); Enzhen Huang, Lafayette, CA (US); David Ly-Gagnon, San Francisco, CA (US); Benjamin Snyder, Oakland, CA (US); Gautam Vasudev, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 400 days.

(21) Appl. No.: 14/564,719

(22) Filed: Dec. 9, 2014

(65) Prior Publication Data
US 2016/0162448 A1    Jun. 9, 2016

(51) Int. Cl.
*G06F 17/22* (2006.01)
*G06F 17/21* (2006.01)

(52) U.S. Cl.
CPC .......... *G06F 17/227* (2013.01); *G06F 17/212* (2013.01)

(58) Field of Classification Search
CPC .............................. G06F 17/212; G06F 17/227
See application file for complete search history.

(56) References Cited

U.S. PATENT DOCUMENTS

| | | | |
|---|---|---|---|
| 5,060,170 A * | 10/1991 | Bourgeois | G09G 5/14 715/788 |
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,760,772 A * | 6/1998 | Austin | G06F 3/0481 715/798 |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |

(Continued)

Primary Examiner — Maikhanh Nguyen
(74) Attorney, Agent, or Firm — Lorenz & Kopf, LLP (57) ABSTRACT

Methods and systems are provided for rearranging the content within a sub-region of a web page in response to resizing the sub-region, the content including a plurality of columns each having a respective width parameter, the system including a processor configured to implement the steps of: detecting a resizing event associated with the sub-region; determining a span value associated with the resized sub-region; determining a subset of the plurality of columns that fit within the span value based on the width parameters; and displaying the subset of columns within the resized sub-region.

13 Claims, 5 Drawing Sheets

(56) References Cited

U.S. PATENT DOCUMENTS

| | | |
|---|---|---|
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,181,758 B1 | 2/2007 | Chan |
| 7,231,596 B2 * | 6/2007 | Koren ............ G06F 17/30893 707/E17.12 |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,430,712 B2 * | 9/2008 | Arokiaswamy ... G06F 17/30893 707/E17.117 |
| 7,508,789 B2 | 3/2009 | Chan |
| 7,620,655 B2 | 11/2009 | Larsson et al. |
| 7,698,160 B2 | 4/2010 | Beaven et al. |
| 7,725,815 B2 * | 5/2010 | Peters ................ G06F 17/211 715/227 |
| 7,779,475 B2 | 8/2010 | Jakobson et al. |
| 7,831,579 B2 * | 11/2010 | Wade ............. G06F 17/30864 707/705 |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,687,023 B2 * | 4/2014 | Markiewicz .......... G06F 3/0485 345/173 |
| 9,213,460 B2 * | 12/2015 | Nurse ................ G06F 3/048 |
| 9,280,523 B2 * | 3/2016 | Ellis ................ G06F 17/212 |
| 9,330,068 B2 * | 5/2016 | Ellis ................ G06F 17/212 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2002/0194095 A1 * | 12/2002 | Koren ............ G06F 17/30893 705/35 |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 * | 12/2004 | Lei ................ G06F 9/4443 717/106 |
| 2005/0050555 A1 | 3/2005 | Exley et al. |
| 2005/0091098 A1 | 4/2005 | Brodersen et al. |
| 2005/0120293 A1 * | 6/2005 | Benhase ............ G06F 17/246 715/217 |
| 2006/0021019 A1 | 1/2006 | Hinton et al. |
| 2006/0212803 A1 * | 9/2006 | Arokiaswamy ... G06F 17/30893 715/201 |
| 2006/0212806 A1 * | 9/2006 | Griffin ............ G06F 17/218 715/206 |
| 2008/0028290 A1 * | 1/2008 | Suwiryo ............ G06F 3/0481 715/227 |
| 2008/0104091 A1 * | 5/2008 | Chin ................ G06F 17/30 |
| 2008/0168388 A1 * | 7/2008 | Decker ............ G06F 3/0481 715/800 |
| 2008/0249972 A1 | 10/2008 | Dillon |
| 2009/0063414 A1 | 3/2009 | White et al. |
| 2009/0100342 A1 | 4/2009 | Jakobson |
| 2009/0164915 A1 * | 6/2009 | Gasn ............ G06F 17/30893 715/753 |
| 2009/0177744 A1 | 7/2009 | Marlow et al. |
| 2010/0218090 A1 * | 8/2010 | Amit ................ G06F 17/211 715/247 |
| 2011/0225233 A1 * | 9/2011 | Casalaina ......... G06F 17/30528 709/203 |

(56) References Cited

U.S. PATENT DOCUMENTS

| | | | |
|---|---|---|---|
| 2011/0264996 A1* | 10/2011 | Norris, III | G06F 3/0482 |
| | | | 715/236 |
| 2011/0289398 A1* | 11/2011 | Chin | G06F 17/245 |
| | | | 715/227 |
| 2011/0296336 A1* | 12/2011 | Law | G06F 3/0483 |
| | | | 715/777 |
| 2012/0191865 A1* | 7/2012 | Duff | G06F 17/30303 |
| | | | 709/228 |
| 2012/0233137 A1 | 9/2012 | Jakobson et al. | |
| 2012/0256949 A1* | 10/2012 | Treat | G06F 9/4443 |
| | | | 345/629 |
| 2013/0055078 A1* | 2/2013 | Berger | G06F 3/0483 |
| | | | 715/273 |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2014/0129916 A1* | 5/2014 | Tuovinen | G06F 11/3684 |
| | | | 715/234 |
| 2014/0208197 A1* | 7/2014 | Ellis | G06F 17/212 |
| | | | 715/234 |
| 2014/0208202 A1* | 7/2014 | Ellis | G06F 17/212 |
| | | | 715/238 |

\* cited by examiner

METHODS AND SYSTEMS FOR APPLYING RESPONSIVE DESIGN TO SUBFRAMES ON A WEB PAGE

TECHNICAL FIELD

Embodiments of the subject matter described herein relate generally to responsive web designs and, more particularly, to computer systems and applications for developing and implementing web pages having independently re-configurable sub-regions.

BACKGROUND

Responsive web design (RWD) approaches seamlessly adapt the layout of a browser window for display across different devices including desktop computers, lap tops, tablets, and mobile phones. The fluid grid technique resizes page elements in relative units (e.g., percentages), rather than absolute units (e.g., pixels). Flexible images are also sized in relative units, so as to prevent them from displaying outside their container. Media queries allow the page to use different CSS style rules based on characteristics of the device (e.g., the browser window width). Tool kits such as Bootstrap and w3schools provide HTML and CSS-based RWD design templates.

Presently known RWD techniques are limited in that they are based entirely on the size of the browser window; that is, they rearrange the contents of a browser window when the entire window is resized to accommodate different media (e.g., tablet, mobile phone, desktop display). However, current RWD approaches do not allow for the rearrangement of contents of a re-sized sub-region within a browser window. Although work-arounds have been proposed for rearranging the contents of an iframe when a browser window is re-sized, presently known RWD techniques do not rearrange the contents of sub-regions other than iframes.

At the same time, modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" supplied by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Embodiments of the subject matter described herein generally relate to techniques for rearranging the content within a sub-region of a browser window when that sub-region is re-sized such as, for example, when a border of the sub-region is dragged by the user to increase or decrease the size of the sub-region.

More particularly, web pages can be designed in such a way that they "respond" to differences in form factors and aspect ratios of the media on which the page is displayed. For example, on a small mobile phone, information may be displayed in a more concise manner for better screen real estate utilization, while on a larger tablet or desktop device, there is less of a need to impose restrictions. Such responsive web pages are commonly implemented using CSS Media Queries. However, CSS Media Queries only work if the rendering of responsive content is based on the size and type of the screen or media. Presently known techniques do not responsively render variably-sized sub-frames (or sub-regions) within the page.

Various embodiments provide a framework for dynamically attaching CSS classes to targeted elements within a sub-frame as the sub-frame is either manually or automatically resized. Predefined CSS styles will then dynamically affect the tagged elements. Moreover, the mechanism is sub-frame-independent, and thus may be reused by multiple sub-frames.

Figure 1:
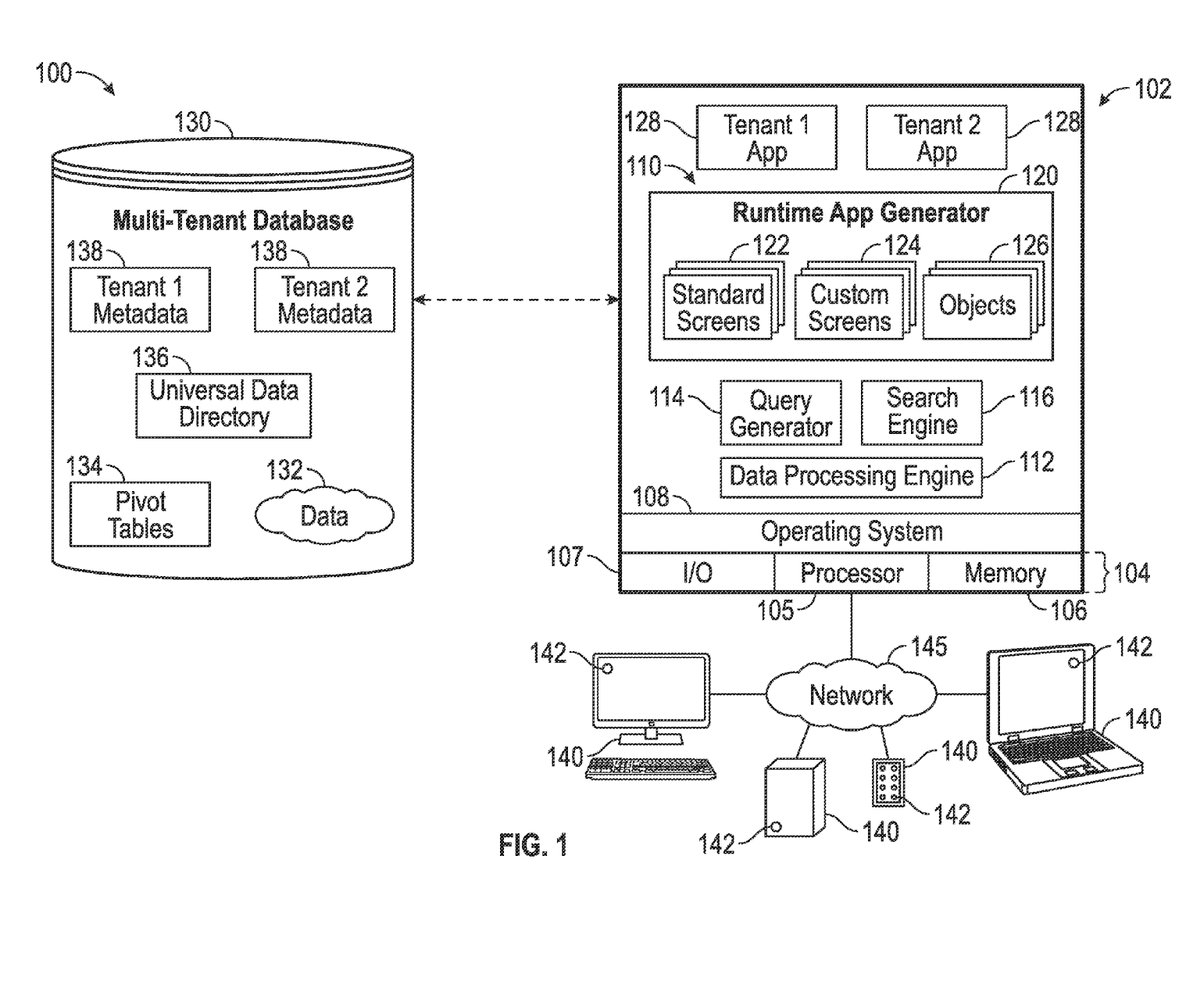
FIG. 1 is a schematic block diagram of an exemplary multi-tenant computing environment

Turning now to FIG. 1, an exemplary multi-tenant system 100 includes a server 102 that dynamically creates and supports virtual applications 128 based upon data 132 from a database 130 that may be shared between multiple tenants, referred to herein as a multi-tenant database. Data and services generated by the virtual applications 128 are provided via a network 145 to any number of client devices 140, as desired. Each virtual application 128 is suitably generated at run-time (or on-demand) using a common application platform 110 that securely provides access to the data 132 in the database 130 for each of the various tenants subscribing to the multi-tenant system 100. In accordance with one non-limiting example, the multi-tenant system 100 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 130. In this regard, each tenant includes one or more users associated with, assigned to, or otherwise belonging to that respective tenant. Stated another way, each respective user within the multi-tenant system 100 is associated with, assigned to, or otherwise belongs to a particular one of the plurality of tenants supported by the multi-tenant system 100. Tenants may represent companies, corporate departments, business or legal organizations, and/or any other entities that maintain data for particular sets of users (such as their respective customers) within the multi-tenant system 100. Although multiple tenants may share access to the server 102 and the database 130, the particular data and services provided from the server 102 to each tenant can be securely isolated from those provided to other tenants. The multi-tenant architecture therefore allows different sets of users to share functionality and hardware resources without necessarily sharing any of the data 132 belonging to or otherwise associated with other tenants.

The multi-tenant database 130 may be a repository or other data storage system capable of storing and managing the data 132 associated with any number of tenants. The database 130 may be implemented using conventional database server hardware. In various embodiments, the database 130 shares processing hardware 104 with the server 102. In other embodiments, the database 130 is implemented using separate physical and/or virtual database server hardware that communicates with the server 102 to perform the various functions described herein. In an exemplary embodiment, the database 130 includes a database management system or other equivalent software capable of determining an optimal query plan for retrieving and providing a particular subset of the data 132 to an instance of virtual application 128 in response to a query initiated or otherwise provided by a virtual application 128, as described in greater detail below. The multi-tenant database 130 may alternatively be referred to herein as an on-demand database, in that the multi-tenant database 130 provides (or is available to provide) data at run-time to on-demand virtual applications 128 generated by the application platform 110, as described in greater detail below.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants. Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 may be implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like. The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or platform, e.g., a portable hard drive, a USB flash drive, an optical disc, or the like.

The application platform 110 is any sort of software application or other data processing engine that generates the virtual applications 128 that provide data and/or services to the client devices 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the client devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the client devices 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its client device 140, as appropriate.

The runtime application generator 120 suitably interacts with the query generator 114 to efficiently obtain multi-tenant data 132 from the database 130 as needed in response to input queries initiated or otherwise provided by users of the client devices 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request.

With continued reference to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled client device 140 on the network 145. In an exemplary embodiment, the client device 140 includes a display device, such as a monitor, screen, or another conventional electronic display capable of graphically presenting data and/or information retrieved from the multi-tenant database 130, as described in greater detail below. Typically, the user operates a conventional browser application or other client program 142 executed by the client device 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. As noted above, the virtual application 128 may contain Java, ActiveX, or other content that can be presented using conventional client software running on the client device 140; other embodiments may simply provide dynamic web or other content that can be presented and viewed by the user, as desired. As described in greater detail below, the query generator 114 suitably obtains the requested subsets of data 132 from the database 130 as needed to populate the tables, reports or other features of the particular virtual application 128.

In accordance with one embodiment, application 128 may embody techniques for rendering a web page in the context of a browser window. More particularly and referring now to FIG. 2, an exemplary prior art technique for rearranging content within a re-sized browser window is shown. A first browser window 202 for display on a desk top computer includes three columns, each having four rows of text, graphics, or the like, for a total of twelve rows of displayed data. A second browser window 204 is resized to accommodate a smaller display area such as a tablet computer or, alternatively, the window size may be decreased by dragging a corner inwardly to reduce the size of the window. Note that the twelve rows of data are automatically rearranged (e.g., wrapped around) as two columns of six rows to fit within the smaller window area, using conventional cascading style sheet (CSS) @media queries.

Figure 2:
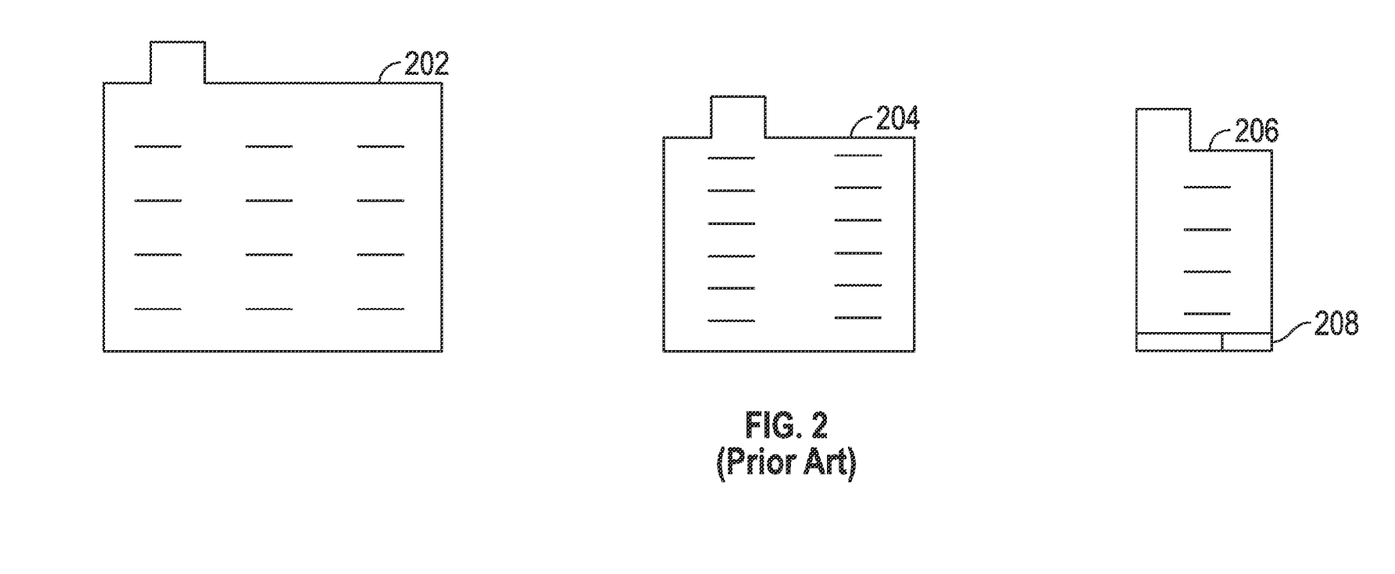
FIG. 2 is a schematic block diagram of an exemplary prior art technique for rearranging content within a re-sized browser window.

With continued reference to FIG. 2, a third browser window 206 for use on a mobile phone is further reduced to a size too small to display all twelve rows of data. As a result, the remaining rows are "off screen" and can be revealed by manipulating a conventional scroll bar 208.

Figure 3:
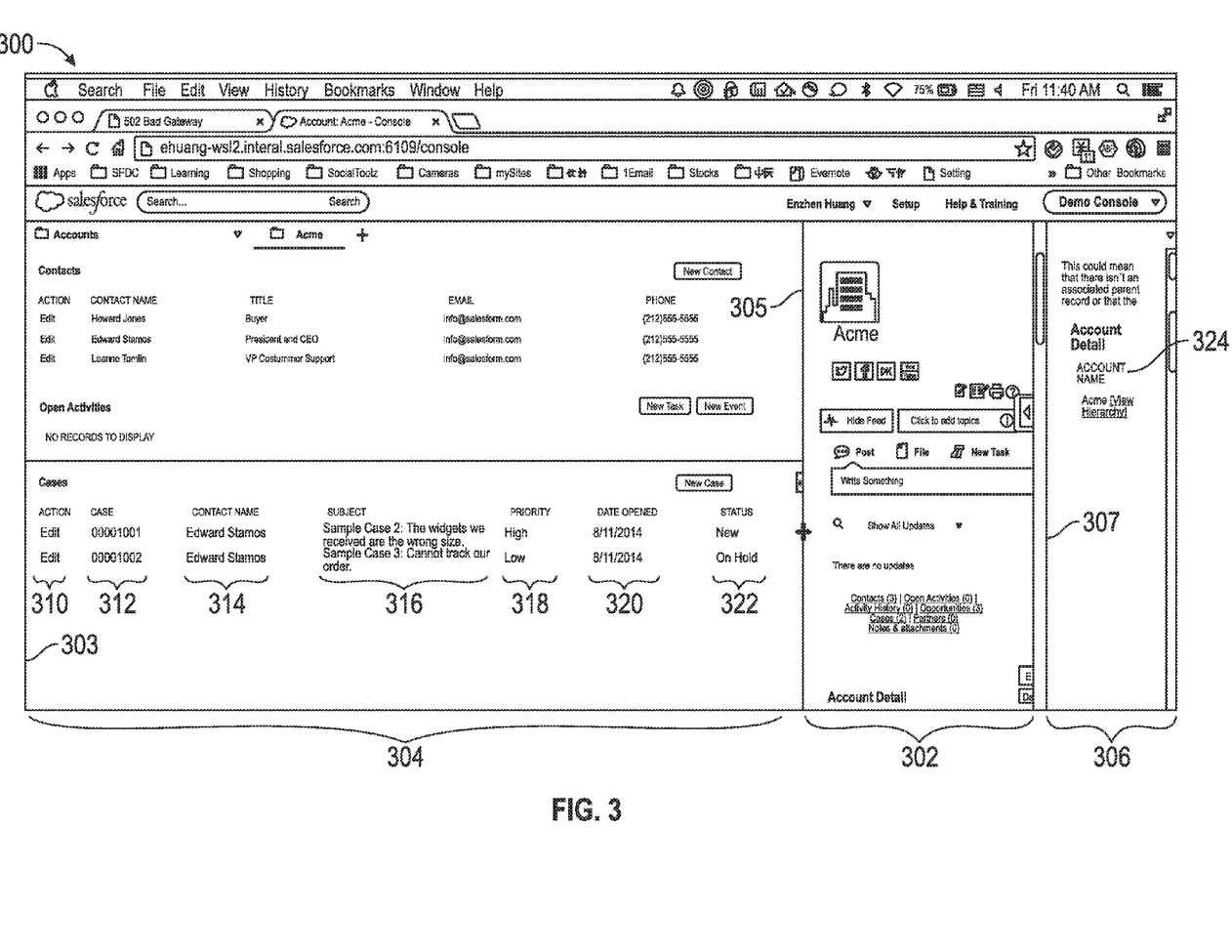
FIG. 3 is a screen shot of an exemplary web page illustrating a first arrangement of content within a sub-region in accordance with various embodiments.

FIG. 3 is a screen shot of an exemplary web page 300 illustrating a first arrangement of content within a sub-region in accordance with various embodiments. In particular, web page 300 includes a main feed 302, a first sub-region 304, a second sub-region 306, a left border 303, a first slidable border 305 between the main feed 302 and the first sub-region 304, and a second slidable border 307 between the main feed 302 and the second sub-region 306. In accordance with various embodiments, a web page may have any number of nested frames or sub-regions, and each sub-region may have any number of columns of data. In the illustrated embodiment, the second sub-region 306 has two columns, but only one column 324 is shown because the size (e.g., width) of the sub-region is not sufficient to display both columns; the second column is displayed and discussed in conjunction with FIG. 4, below.

In various embodiments, one or more sub-regions may be resized and the data inside the sub-region may be rearranged, even though the size of the browser window may remain intact. Rather than using @media functions, various embodiments employ a responsive design algorithm to determine which columns are to be displayed in a resized sub-region, and intelligently rearrange the contents of the sub-region accordingly. For example, the algorithm may be configured to "listen" for a resize event. When a sub-region is resized, a parameter associated with the newly sized sub-region (e.g., the width expressed as an integer number of pixels) is input into the algorithm, as described in greater detail below.

With continued reference to FIG. 3, the first sub-region 304 includes a total of seven columns: an "Action" column 310; a "Case" column 312; a "Contact Name" column 314; a "Subject" column 316; a "Priority" column 318; a "Date Opened" column 320; and a "Status" column 322. If the total width of sub-region 304 between the left border 303 and the slidable border 305 is sufficient to accommodate all seven columns, then all seven columns will be displayed. If, on the other hand, the width (or other parameter) of sub-region 304 is reduced, the algorithm intelligently determines how many and/or which columns are displayed within the new, smaller area, and rearranges the columns accordingly, as described in greater detail below.

Figure 4:
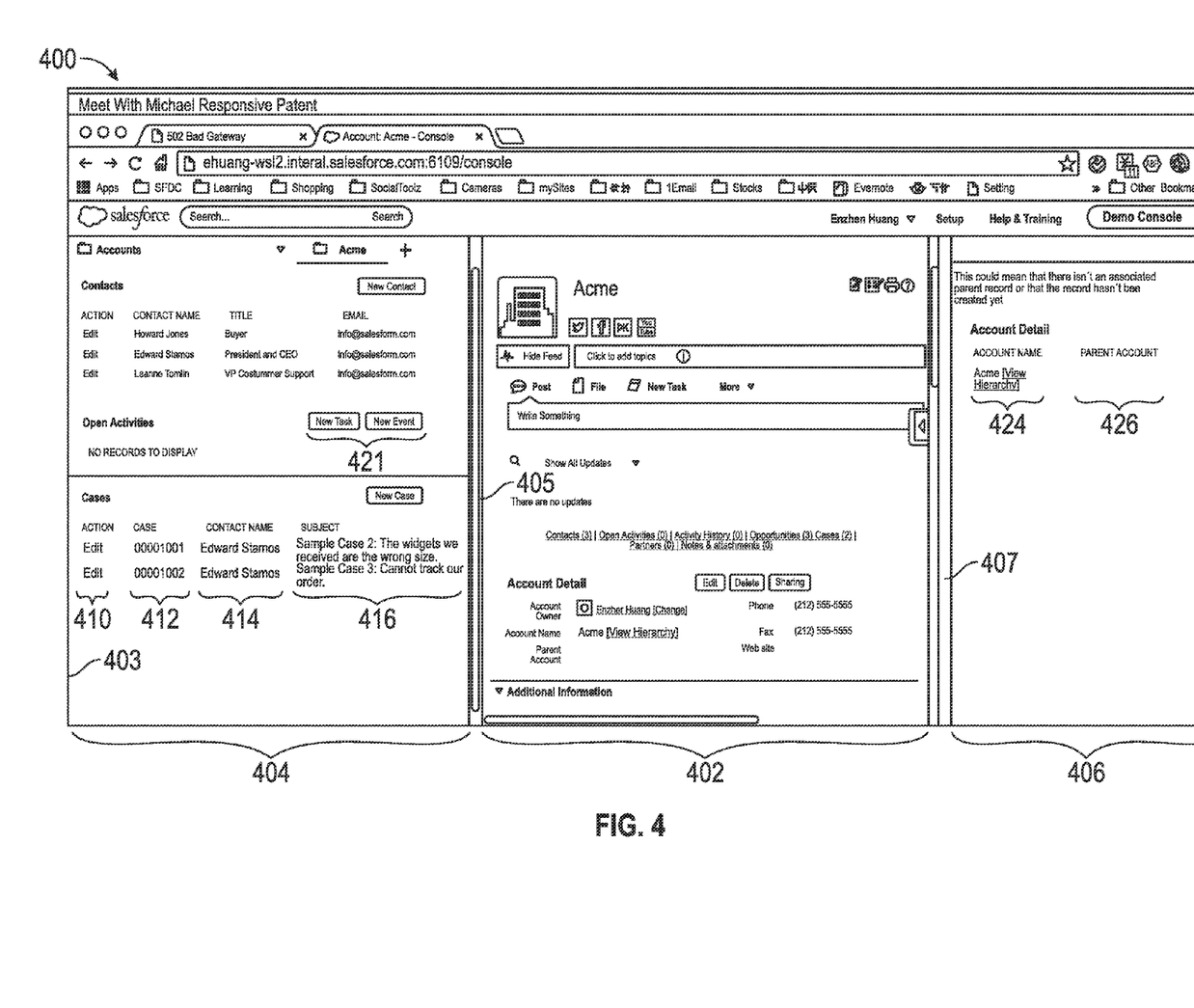
FIG. 4 is a screen shot of an exemplary web page illustrating a second arrangement of content within the sub-region of FIG. 3 with the sub-region resized in accordance with various embodiments.

Referring now to FIG. 4, a screen shot of an exemplary web page 400 illustrates a second arrangement of the contents within the sub-regions responsive to the left-most panel (sub-region) being resized to a smaller area. In particular, the width of sub-region 304 of FIG. 3 may be reduced by dragging the sidable border 305 to the left, resulting in the resized configuration shown in FIG. 4.

Web page 400 includes a main feed 402, a first sub-region 404, a second sub-region 406, a left border 403, a first slidable border 405 between the main feed 402 and the first sub-region 404, and a second slidable border 407 between the main feed 402 and the second sub-region 406. Notice that the contents of sub-regions 404 and 406 are intelligently rearranged responsive to movement of one or more of the slidable borders, while the contents of the main feed 402 are simply revealed (if the column width is great enough to accommodate the entire feed) or truncated (if the column width is insufficient to accommodate the entire feed).

As a result of the decreased width of sub-region 404, the contents of both sub-region 404 and sub-region 406 are intelligently rearranged. Specifically, sub-region 406 is expanded such that a second column 426 is now displayed, whereas column 426 was hidden in FIG. 3 because the total width of sub-region 306 was insufficient to display both columns. Moreover, the total width of sub-region 404 between the left border 403 and the slidable border 405 is reduced requiring the responsive design algorithm of the present invention to intelligently rearrange the contents of the newly resized subregion.

More particularly, only the following four columns are displayed in the illustrated embodiment: an "Action" column 410; a "Case" column 412; a "Contact Name" column 414; and a "Subject" column 416. The manner in which the algorithm determines how many and which columns are to be displayed, and which columns are to be hidden, will now be described in accordance with an exemplary embodiment.

The algorithm listens for a resize event. After sliding or dragging the border 405 into the position shown in FIG. 4, the pixel width of sub-region 404 is determined and fed into the algorithm. That is, the distance between the left border 403 and the slidable border 405, expressed in pixels, is applied as an input to the algorithm. In the illustrated example, the width of sub-region 404 is, say, one thousand (1,000) pixels. Each column within the sub-region is characterized by one or more properties including, for example, a static or dynamic column width and a relative or absolute priority parameter. An absolute priority parameter implies that the column must be displayed (in some form) regardless of how small the sub-region is resized to. A relative priority parameter may be used to rank the columns in order of display priority; that is, if there is only enough room to display some—but not all—of the columns, the algorithm uses the priority parameters to determine which columns to display.

A static column width parameter implies that a column is displayed as a fixed or predetermined pixel width, say, 170 pixels. A dynamic column width parameter, on the other hand, implies that a column is to be displayed as a function of available pixels. For example, a dynamic column width parameter may implement the following function: if the total sub-region width is greater than 800 pixels, then display this particular column using 170 pixels; whereas if the total sub-region width is less than 800 pixels, then display this particular column using 100 pixels. Alternatively, a column width parameter may be expressed as a percentage of the available sub-region width, e.g., display this column using 20% of the available sub-region width.

By way of illustration and referring again to FIGS. 3 and 4, assume that the "Action" column (303, 403) has a static width of 50 pixels, and that each of the remaining columns have a static width of 170 pixels for a total span of 1072 pixels (50+6*170). Accordingly, upon detection of a resizing event, the then current value of the available pixel width is fed into the responsive design algorithm. If the available width is greater than 1072, all seven columns are displayed as shown in FIG. 3. Upon the detection of another resizing event, the new current value of the available pixel width is again fed into the algorithm, and the algorithm calculates the number of columns which can be displayed within the available sub-region width based on their width parameters, and further determines which columns may be displayed based on their priority parameters. If the new value is between 560 and 729 pixels, then the Action column 410 (50 pixels) and three other columns (e.g., 412, 414, 416) may be displayed as shown in FIG. 4. If the available sub-region width is between 730 and 899, then the Action column and four additional columns may be displayed, and so on. In an embodiment, those columns which do not fit within the available sub-region width after resizing are hidden using attached CSS classes.

Figure 5:
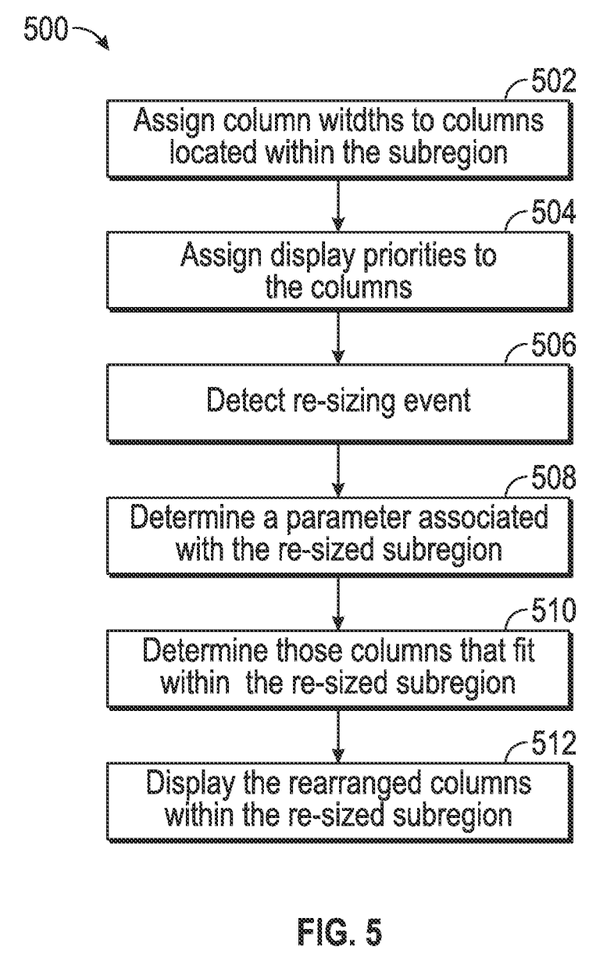
FIG. 5 is a flow chart illustrating an exemplary method of rearranging content within a sub-region of a web page when the sub-region is resized in accordance with various embodiments.

FIG. 5 is a flow chart illustrating an exemplary method 500 of rearranging content within a sub-region of a web page when the sub-region is resized. More particularly, the method 500 includes assigning (Task 502) a column width value to at least one of a plurality of columns within the subregion; assigning (Task 504) a display priority to the at least one column; detecting (Task 506) a resizing event associated with the sub-region; determining (Task 508) a span value associated with the resized sub-region; determining (Task 510) a subset of the plurality of columns that fit within the span value based on the width value; and displaying (Task 512) the subset of columns within the resized sub-region.

In accordance with a further embodiment, a "responsive lookup" algorithm may be configured to display fields in rows, and determine the number of rows necessary to display the fields based on the available column width. In this approach, the data need not be hidden, but rather reshaped to have fewer columns but more rows, as needed. This is different from the related list responsiveness where we hide columns based on the width available The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to computer programming, computer networking, database querying, database statistics, query plan generation, XML and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first", "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In this regard, it should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In this regard, the subject matter described herein can be implemented in the context of any computer-implemented system and/or in connection with two or more separate and distinct computer-implemented systems that cooperate and communicate with one another. That said, in exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method of rearranging content within an existing displayed sub-region of a web page in response to resizing the sub-region, the content including a plurality of columns each having a respective width parameter, the method comprising:
   detecting resizing of the existing displayed sub-region within the webpage, wherein the sub-region comprises a slidable border, and resizing of the sub-region comprises manual or automatic dragging of the slidable border;
   determining a span value associated with the resized sub-region;
   defining a minimum width beyond which the resized sub-region cannot be reduced;
   determining a subset of the plurality of columns that fit within the span value based on the respective width parameters, wherein each respective width parameter comprises one of a fixed parameter and a dynamic parameter;
   displaying the subset of columns within the resized existing displayed sub-region; and
   simultaneously rearranging the contents of a second existing displayed sub-region in response to the resizing of the first existing displayed sub-region.

2. The method of claim 1, wherein the dynamic parameter comprises a predetermined percentage of the span value.

3. The method of claim 1, further comprising the step of assigning a respective priority parameter to each column.

4. The method of claim 3, wherein the priority parameter comprises one of an absolute and relative value.

5. The method of claim 1, further comprising the step of configuring a set of rules for determining the subset of columns.

6. The method of claim 5, wherein the set of rules is implemented in a cascading style sheet (CSS).

7. The method of claim 1, further comprising hiding a second subset of columns.

8. The method of claim 7, further comprising revealing the second subset of columns in response to a user request.

9. The method of claim 8, wherein the user request comprises hovering a cursor over a virtual button indicative of the hidden columns.

10. Computer code stored in a non-transient medium for rearranging content within an existing displayed sub-region of a web page in response to resizing the existing displayed sub-region, the content including a plurality of columns each having a respective width parameter, the computer code configured to implement the steps of:
   detecting resizing of the existing displayed sub-region within the webpage, wherein the sub-region comprises a slidable border, and resizing of the sub-region comprises movement of the slidable border through one of manual or automatic dragging;
   determining a span value associated with the resized existing displayed sub-region;
   defining a minimum width beyond which the resized sub-region cannot be reduced;

determining a subset of the plurality of columns that fit within the span value based on the respective width parameters, wherein each respective width parameter comprises one of a fixed parameter and a dynamic parameter;

displaying the subset of columns within the resized existing displayed sub-region; and simultaneously rearranging the contents of a second existing displayed sub-region in response to the resizing of the first existing displayed sub-region.

11. The computer code of claim 10, further configured to implement the step of assigning a respective priority parameter to each column, wherein the priority parameter comprises one of an absolute and relative value.

12. The computer code of claim 10, further configured to implement the step of configuring a set of rules for determining the subset of columns, wherein the set of rules is implemented in a cascading style sheet (CSS).

13. A computer system for rearranging the content within an existing displayed sub-region of a web page in response to resizing the existing displayed sub-region, the content including a plurality of columns each having a respective width parameter, the system including a processor configured to implement the steps of:

detecting resizing of the existing displayed sub-region within the webpage, wherein the sub-region comprises a slidable border, and resizing of the sub-region comprises movement of the slidable border through one of manual or automatic dragging;

determining a span value associated with the resized existing displayed sub-region;

defining a minimum width beyond which the resized sub-region cannot be reduced;

determining a subset of the plurality of columns that fit within the span value based on the respective width parameters, wherein each respective width parameter comprises one of a fixed parameter and a dynamic parameter;

displaying the subset of columns within the resized existing displayed sub-region; and simultaneously rearranging the contents of a second existing displayed sub-region in response to the resizing of the first existing displayed sub-region.

* * * * *